United States Patent [19]
Foster et al.

[11] Patent Number: 5,151,147
[45] Date of Patent: Sep. 29, 1992

[54] COATED ARTICLE PRODUCTION SYSTEM

[75] Inventors: Walter W. Foster, Henrico County; Gregory L. Boatwright, Glen Allen; Thomas E. Lewis, Richmond, all of Va.

[73] Assignee: Reynolds Metals Company, Richmond, Va.

[21] Appl. No.: 569,356

[22] Filed: Aug. 17, 1990

[51] Int. Cl.$^5$ .............................................. B29C 47/02
[52] U.S. Cl. ........................ 156/244.12; 156/244.24; 156/285; 156/500; 72/46; 72/253.1; 72/258; 72/260; 264/211.13; 264/259; 264/271.1; 264/272.11; 425/113
[58] Field of Search ................... 156/244.12, 285, 500, 156/244.24; 264/259, 271.1, 272.11, 279, 279.1, 149, 211.13; 427/117; 425/113; 72/46, 253.1, 257, 258, 260, 264, 268

[56] References Cited

U.S. PATENT DOCUMENTS

| | | | |
|---|---|---|---|
| 2,956,305 | 10/1960 | Raydt et al. | 425/113 |
| 3,225,385 | 12/1965 | Kleine | 425/113 |
| 3,581,343 | 6/1971 | Henrikson et al. | 425/113 |
| 3,689,610 | 9/1972 | Nicholson | 425/113 |
| 3,852,875 | 12/1974 | McAmis et al. | 72/46 |
| 4,163,377 | 8/1979 | Moreau | 72/258 |
| 4,521,173 | 6/1985 | Hilker et al. | 425/113 |
| 4,610,725 | 9/1986 | East et al. | 72/253.1 |

OTHER PUBLICATIONS

"An Introduction and Guide to Extrusion", Allen L. Griff, Plastic Extrusion Operating Manual, pp. 2,3,24,28 and 29, (1987).

"The Continuous Extrusion Process" Babcock Wire Equipment Ltd.

Primary Examiner—Caleb Weston
Attorney, Agent, or Firm—Alan M. Biddison

[57] ABSTRACT

A coated wire or other elongated article production system having means to form wire or other elongated article in tandem with an extruder of substantially solvent-free polymer in tubular form around the wire or article. The tubular polymer is applied to the wire or article with the aid of a vacuum, and the froming speed relative to the rate of polymer extrusion is controlled to thin the tubular polymer between its extrusion and its contact with the wire or article.

8 Claims, 2 Drawing Sheets

COATED ARTICLE PRODUCTION SYSTEM

BACKGROUND OF THE INVENTION

Electrically conductive metal wire has long been coated with insulative polymer and wound in coils for use as magnets, where the operating conditions of the magnets require a thin but reliable insulative coating.

Magnet wire is conventionally made by first producing the bare wire and shaping it to the desired cross-section, and later, in an entirely separate operation, applying a coating to the wire. One reason for performing these operations separately is that the conventional coating process takes much longer than the shaping process.

Conventional magnet wire coating processes are troublesome. For example, in many cases they depend on use of solvents which risk polluting the atmosphere.

SUMMARY OF THE INVENTION

The present invention overcomes the above-mentioned problems and achieves improved efficiency and economy by using a continuous wire forming system to produce the bare wire in the desired cross-section, and operating the wire forming system in tandem with a coating system which continuously receives the formed wire and around it extrudes a tube of thermoplastic polymer with little or no solvent content, while controlling the polymer extrusion temperatures and the relative speeds of extrusion of the wire and extrusion of the polymer to draw the extruded polymer down to a thickness much less than its extruded thickness. A vacuum induced inside the extruded polymeric tube causes atmospheric pressure to apply the polymer tightly against the metal wire. Also, the polymer extrusion die has an outlet orifice extending around the wire periphery in a shape like but larger than the wire periphery, such as in a circle or rectangle around a wire of circular or rectangular cross-section. In these ways unusually thin but uniform and effective coatings may be achieved, such as about 3 mils.

The means for continuously forming the wire is preferably an extruder of the kind which drives a grooved wheel to drag metal feed stock against a semicircular plate which forms part of a chamber. The incoming metal is compressed against the plate and forced out of the chamber through an extrusion die to produce wire of the required round or rectangular cross-section.

As the wire passes from the former on its way to the coater, it is cooled or otherwise brought to the temperature desired for purposes of subsequent coating. When it leaves the coater, the coated wire may be baked, if required. In any case, the coated wire is preferably cooled before being coiled.

Other advantages, objects and details of the invention will become as the following description proceeds.

DRAWINGS ILLUSTRATING THE INVENTION

A present preferred embodiment of the invention is illustrated in the accompanying drawings, in which.

DETAILED DESCRIPTION OF PRESENT PREFERRED EMBODIMENTS OF THE INVENTION

Figure 1:
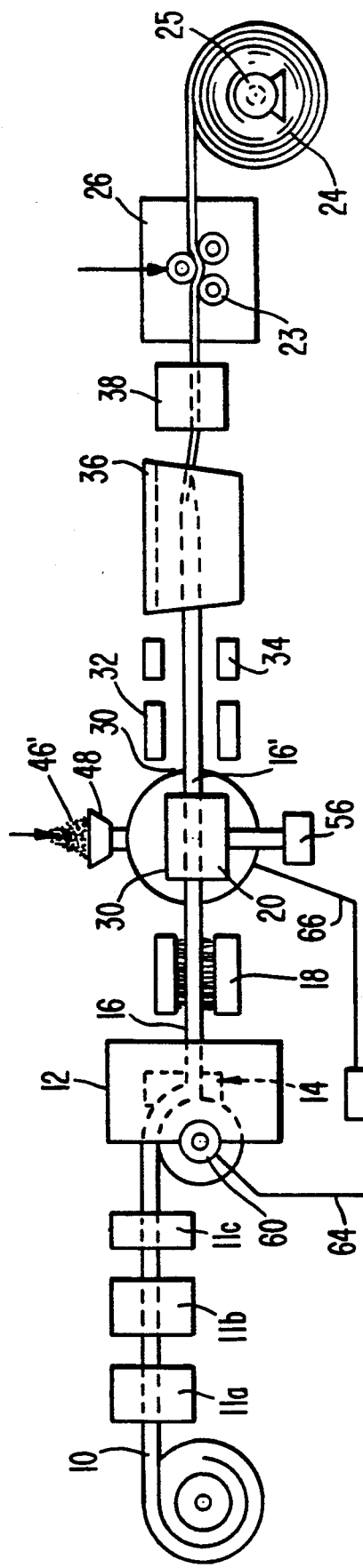
FIG. 1 shows schematically a side view of a production line for continuously forming and coating wire.

Referring now more particularly to the drawings, and initially to FIG. 1, a coil of metal feedstock 10 passes through successive treating units 11a for wire brushing, 11b for chemical cleaning, and 11c for ultrasonic rinsing. A rotary extrusion press 12 receives the incoming treated metal feedstock and extrudes it continuously through a die 14 in the form of a bare metal wire 16. The continuity of extrusion may be extended by splicing on more feedstock as feedstock 10 is used up. The orifice of die 14 determines the cross-sectional shape of the wire, which can be circular for some purposes, including some magnet wire, but may be rectangular in the case of magnet wire required to be wound compactly in a insulated coil connected to an electric power source.

Figure 3:
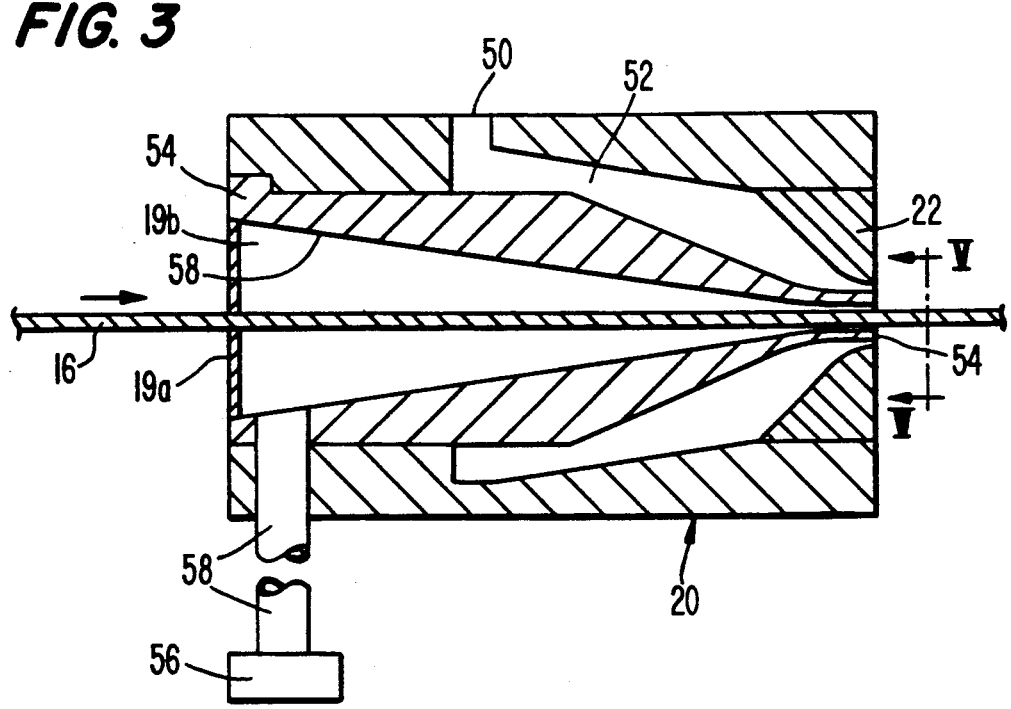
FIG. 3 shows a top view, partially broken away, of a horizontal section through the die and associated parts for the polymer extruder, including the extruded wire passing through the polymer extruder but omitting the polymer.
Figure 4:
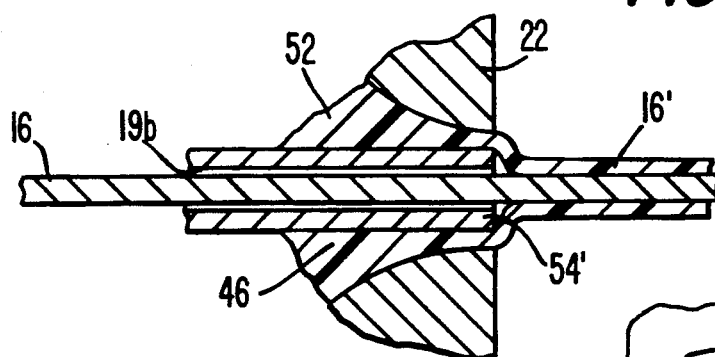
FIG. 4 shows an enlarged view, further broken away, of the section of FIG. 3, while the polymer is being extruded and applied to the wire.
Figure 5:
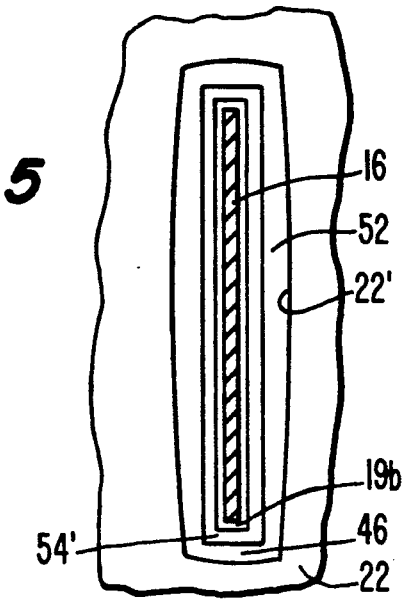
FIG. 5 shows a further enlarged section on the line V-V in FIG. 3.

The wire 16 as extruded is likely to be too hot for application of insulative coating until it has been partially cooled by passing through a cooling unit 18, where a cooling medium such as air is blown against the wire. After being cooled or otherwise brought to a temperature suitable for coating, the wire passes through a close fitting opening of a wall 19a into a space 19b within a housing 20 of a die 22 for extruding plastic coating (FIGS. 3 and 4). The wire continues through die 22, which is of annular shape and extends around the wire so that the central axis of the die coincides with the central axis of the path of wire 16 a it is drawn from extrusion die 14 over a roll 23 and onto a take-up roll 24. A motor 25 rotates the roll 24 with sufficient force, controlled by a tension maintaining device 26, to move the wire in a substantially straight and fixed path between die 14 and roll 23.

As shown in FIG. 1, bare wire 16 enters one side of die housing 20, where it receives a polymer coating and becomes coated wire 16'. The freshly coated wire preferably passes through a baking unit 32 to cure the polymer. It may then pass through an air cooling zone 34 (where it may be air blown) before passing through a cooling trough 36, where the coated wire is submerged in a cooling medium such as overflowing water by entering and leaving through notches in weirs at the ends of the trough. The coated wire then passes through an insulation testing unit 38, and thence through the tension maintaining unit 26 onto roll 24.

Figure 2:
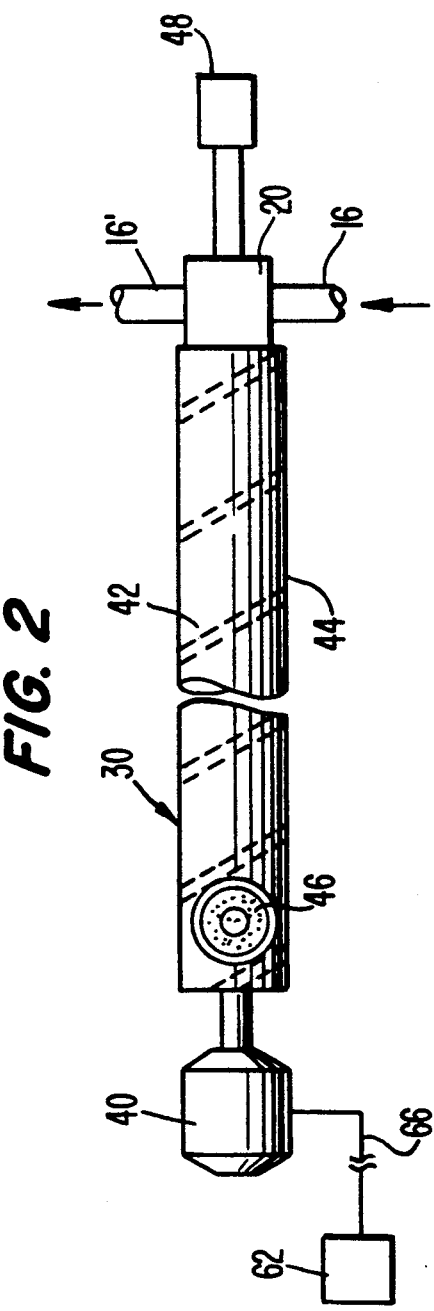
FIG. 2 shows an enlarged top view, partially broken away, of the polymer coating extruder used in the line of FIG. 1.

The polymer extruder 30 has a motor 40 driving a screw 42 in a long barrel 44 (FIG. 2). Polymer 46 in the form of solid particles 46' is fed through a hopper 48 (FIG. 1) into one end of barrel 44. The other end of the barrel has an outlet connected to the inlet end 50 of a passage 52 through die housing 20 (FIG. 3). Passage 52 extends between the housing 20 and a tapered tubular member 54, and continues between the narrowest part of the opening through die 22 and the tip 54' projecting from the small end of member 54 through the die opening. The larger end of member 54 is closed by wall 19a, and a tapered bore through the length of member 54 and its tip 54′ encloses space 19b. Space 19b tapers from its large end closed by wall 19a to the beginning of tip 54′, where the inner surface of die 22 extends around and is spaced from the opposite outer surface of tip 54′.

When the bare wire 16 extends through member 54, a small air passage remains in the parts of space 19b between the outer surface of the bare wire and the surrounding inner surface of tip 54′. A vacuum is drawn in this air passage by a vacuum drawing unit 56 connected through a conduit 58 extending to space 19b through die housing 20 and member 54, when extruder 30 is operated. Polymer 46 is then forced through inlet 50 and along passage 52 until it extrudes between the opening through die 22 and the opposite outer surfaces of tip 54′. There the polymer emerges in tubular form around the outside of bare wire 16. The vacuum between wire 16 and the inside of tip 54′ draws the extruded polymer quickly against wire 16 as it emerges from tip 54′ (FIG. 4). Meanwhile, motor 60 is operated to increase the linear speed of the wire over the linear speed of the polymer through the die. This, in conjunction with adherence of the polymer to the wire (beginning with initial manual pressure on the polymer at the start-up), causes the wire to draw down the thickness of the extruded film of polymer between the time it emerges from the die and the time it is pressed against the wire by the pressure differential between atmospheric pressure and the vacuum in tip 54′. As a result, it is feasible to apply very thin but uniform coatings of polymer in accordance with the invention. Computer control means 62 is connected through line 64 to motor 60 and through line 66 to motor 40 to coordinate the speeds of these motors.

The inner surfaces of tip 54′ surrounding wire 16 are made close to and equidistant from the opposite surfaces of wire 16, and are of slightly larger rectangular cross-section of the same proportions. The outer surfaces of tip 54′ are of still larger rectangular cross-section, also in the same proportions. The wall thickness of tip 54′ is made small but enough for structural integrity and rigidity. The extrusion opening 22′ through the die is also of generally rectangular cross-sectional shape of the same proportions, but is made large enough to permit flow of sufficient polymer to provide the desired coating on the wire at the intended wire and polymer extrusion speeds. However, instead of being exactly rectangular in cross-section, the opening 22′ is preferably bowed slightly outwardly along its long horizontal width, away from the opposite exterior horizontal surfaces of tip 54′, so that the spacing therebetween will be less adjacent the corners than in the middle of the horizontal width of die opening 22′. This has the advantage of offsetting the tendency to have excess amounts of polymer at the corners (known as a dog bone condition of the coating as seen in cross-section through the coated wire).

Wire of rectangular cross section can be run through the line with its longer cross-sectional dimension extending horizontally from extrusion of the bare wire until the coated wire is coiled. However, experience suggests that it is preferable to orient the wire with its wider surfaces vertical and the length of its narrower surfaces horizontal while it is being coated. In the present preferred embodiment, the wire is so oriented from the time the bare wire 16 is extruded from die 14 until the coated wire 16′ is cooled in trough 36. Before leaving trough 36, wire 16′ is twisted by conventional guide rolls so that its broader surfaces are horizontal, for convenience in controlling tension and rolling up thereafter.

Although the invention is particularly useful in coating magnet wire of rectangular cross-section, it is also applicable to wire for other purposes and of other cross-sections, including circular and those in the form of a sector of a circle. The particular metal of the wire is not critical and for magnet wire may include, for example, aluminum base alloys 1350, 6201 and 6101, and copper.

Tests of the invention were run on a Conform continuous extruder to produce magnet wire from ⅛ to ⅜ inch diameter redraw wire of conductor grade aluminum base alloy 1350. The wire emerging from the extruder was at about 900° F. and had cross-sectional dimensions of about 0.120 inch by about 0.390 inch. It moved at about 90–100 feet per minute. It was cooled to about 700° to 800° F. before an extrusion die generally similar to the die 22 shown in FIGS. 1 and 3. The die was supplied with thermoplastic polymer under pressure from a two inch 24:1 L/D ratio Davis Standard extruder connected to a K-D3 crosshead of a cable coater of General Cable Company having a modified tip and die. The tests were run on polyarylsulfone polymer, but other thermoplastic coating polymers with electrical insulating properties can be used, such as polysulfone, polyetherketone, polyethersulfone and polyetherimide.

Plastic particles of the polymer were dried in a regeneration desiccant drier having an air temperature of 325° to 350° F. and a dew point −20° F. The temperature in the various thermal zones of the plastic extruder were about as follows:

| | |
|---|---|
| (1) Feed | 540° F. ± 5° |
| (2) Two transitions | 565° F. ± 5° |
| (3) Metering | 580° F. ± 5° |
| (4) Clamp | 585° F. ± 5° |
| (5) Flange | 585° F. ± 5° |
| (6) Cross head | 585° F. ± 5° |
| (7) Die | 585° F. ± 5° |

An Allen Bradley programmable controller was used to control the temperatures just listed, and also to control the plastic extruder's pressure (typically varying from 2,000 to 4,000 psi) and hence the speed of extrusion of the polymer 44.

The invention is also applicable to use of continuous wire forming apparatus other than an extruder; for example, a wire drawing or rolling machine may be used in the illustrated apparatus in place of the extruder 12. It is also applicable to continuously forming and coating other elongated articles of uniform cross-section (e.q., extruded or drawn tubes).

While present preferred apparatus and methods for practicing the invention have been illustrated and described, it will be understood that the invention may be otherwise variously embodied and practiced within the scope of the following claims.

We claim:

1. Apparatus for producing polymer coated elongated magnet wire of uniform rectangular cross-section from a supply of metal feed stock, said apparatus comprising:
   rotary extrusion press means for receiving incoming feed stock and for continuously extruding magnet wire having a uniform rectangular cross-section;
   means for subjecting the extruded magnet wire to a cooling medium to thereby cool the wire to a temperature suitable for receiving a polymeric material coating;

extruding means for extruding a polymeric material into a tube extending around and initially spaced from extruded wire moving through the extruding means, said extruding means including an extrusion die orifice having outwardly bowed sides to reduce the accumulation of excess amounts of polymeric material at corners of the coated magnet wire;

vacuum means for drawing a vacuum within the tube to thereby cause the tube to be pressed into contact with the extruded wire; and means for controlling the relative speeds of moving of the extruded wire and of the extruding of the polymeric material, said relative speed control means being operable to cause the tube to be drawn down in thickness between where the tube is extruded and where the tube makes contact with the moving extruded wire, thereby reducing the thickness of the polymeric material coated on the extruded wire relative to the initial thickness of the tube when extruded and producing polymer coated elongate magnet wire.

2. Apparatus according to claim 1, further comprising means for cooling the polymer coated elongate magnet wire.

3. Apparatus according to claim 1, further comprising baking means for curing the polymer coated elongate magnet wire.

4. Apparatus according to claim 3, further comprising means for cooling the cured polymer coated elongate magnet wire.

5. A method for producing polymer coated elongated magnet wire of uniform rectangular cross-section from a supply of metal feed stock, said method comprising:

continuously feeding the feed stock into a rotary extrusion press and continuously extruding magnet wire having a uniform rectangular cross-section;

moving the extruded magnet wire through extruder means at a first linear rate of speed;

extruding in the extruder means polymeric material into a tube having non-uniform thickness with the thickness of the tube being reduced at locations corresponding to corners of the wire to offset the tendency to have excess amounts of polymeric material at corners of the coated magnet wire, the tube being around and spaced from the extruder magnet wire, the tube begin extruded at a linear rate of speed less than the first rate so that the thickness of the polymer material is reduced before it contacts the extruded magnet wire; and providing a vacuum between the extruded magnet wire and the polymeric material being extruded thereby causing atmospheric pressure to progressively press the extruded polymeric material into contact with the extruded magnet wire.

6. A method according to claim 5, in which the wire is extruded in a heated condition, and comprising the step of reducing the temperature of the wire from its said heated condition to a still elevated temperature suitable for application of the polymeric material to the wire, preliminary to applying the polymeric material to the wire.

7. A method according to claim 6, in which said still elevated temperature is about 700° to 800° F.

8. A method according to claim 7, in which the polymeric material is polyarylsulfone.

* * * * *